United States Patent [19]

Baldwin, Jr.

[11] Patent Number: 4,793,638

[45] Date of Patent: Dec. 27, 1988

[54] PLASTIC PIPE TO METAL PIPE FITTING

[76] Inventor: Lyman C. Baldwin, Jr., 2130 San Fernando, Los Angeles, Calif. 90065

[21] Appl. No.: 205,205

[22] Filed: Jun. 10, 1988

[51] Int. Cl.$^4$ .............................................. F16L 55/00
[52] U.S. Cl. .................................... 285/174; 285/256
[58] Field of Search ............... 285/256, 259, 174, 382, 285/55

[56] References Cited

U.S. PATENT DOCUMENTS

| | | | |
|---|---|---|---|
| 309,247 | 12/1884 | Patterson | 285/382 |
| 630,047 | 8/1899 | Gilbert | 285/55 |
| 924,515 | 6/1909 | Weber | 285/382 |
| 3,837,686 | 9/1974 | Powell | 285/55 |
| 4,482,170 | 11/1984 | Jacobson et al. | 285/174 |

Primary Examiner—David A. Scherbel
Assistant Examiner—Michele A. Van Patten
Attorney, Agent, or Firm—George J. Netter

[57] ABSTRACT

An interconnection between a plastic pipe and a larger diameter metal pipe having a first retainer ring received onto an end of the plastic pipe, a compressible bushing on the plastic pipe in contact with the first retainer ring, a second retainer ring, a pliant cylindrical seal in contact with the second retainer ring, a washer, an insert tube within the plastic pipe having an enlarged end contacting the washer, the metal pipe being deformed to clampingly engage and distend the pliant cylindrical seal.

4 Claims, 2 Drawing Sheets

PLASTIC PIPE TO METAL PIPE FITTING

The present invention relates generally to a transition fitting, and, more particularly, to a fitting for interconnecting a metal pipe to plastic pipe forming a serviceable junction that is gas-tight and will not pull apart during use.

BACKGROUND OF THE INVENTION

There are many instances in which it is desirable to be able to interconnect plastic pipes (e.g., polyethylene pipes or tubing) to metal pipes and maintain the interconnection under a wide variety of environmental conditions. For example, in the provision of natural gas to home, industries and the like, the source gas is typically transmitted in under street pipes made of plastic while it is conventional to make interconnections from the service pipe to the individual residences or buildings via steel pipes.

However, interconnecting plastic pipes to metal pipes is accompanied by a variety of problems. The most difficult problem accompanying the interconnection of the plastic to metal is that the thermal coefficients of expansion are substantially different, such that upon temperature change the parts either loosen up, the plastic members break or the plastic member pulls out and separates from the fitting.

A number of transition fittings and techniques have been proposed for interconnecting plastic pipe to metal pipe, but all have been found to be possessed of either unsatisfactory operation under certain environmental conditions or are relatively expensive or difficult to install. Still others were operated satisfactorily under various environmental conditions, but were not readily amenable for installation in many field situations.

SUMMARY OF THE DISCLOSURE

In the practice of the present invention, the plastic pipe is required to be of smaller diameter than the metal pipe to which it is to be connected, such that the transition fitting elements to be described and the plastic pipe can be received within an end portion of the metal pipe.

A metal tubing insert having an outer diameter closely matching the inner diameter of the plastic tubing has one flared end and its other end is received within the plastic pipe end. An outer surface portion of the metal tubing insert is provided with grooved rings for a purpose to be described.

In the order named, a first washer having a bore opening substantially equal to the insert outer dimension is received on the insert and held against the insert flared end and the plastic pipe end; an elongated rubber cylinder is placed over the plastic tube with an end thereof abutting against the first washer; a second washer is then received on the plastic tube and held abutting against the end of the rubber cylinder; a deformable metal collar is then located over the plastic pipe with one end abutting against the second washer and a further, or outer washer. Initially, as an intermediate step to final connection, the deformable cylinder is clampingly engaged which causes it to press down upon the outer surface of the plastic pipe and forcing its internal portions into the grooves of the metal insert.

As a final assembly, the plastic pipe end portion with insert, washers and rubber cylinder seal is located within an end portion of the metal pipe and an external circumferential clamping force deforms the metal pipe down upon the rubber cylinder which effects a gas-tight seal.

The described transition fitting not only accomplishes a full gas-tight relation between the parts but also firmly secures the plastic pipe within the metal pipe so that even with unequal expansion experienced during temperature change the plastic pipe will not pull out from the metal pipe.

DESCRIPTION OF A PREFERRED EMBODIMENT

Figures 1, 2, 3:
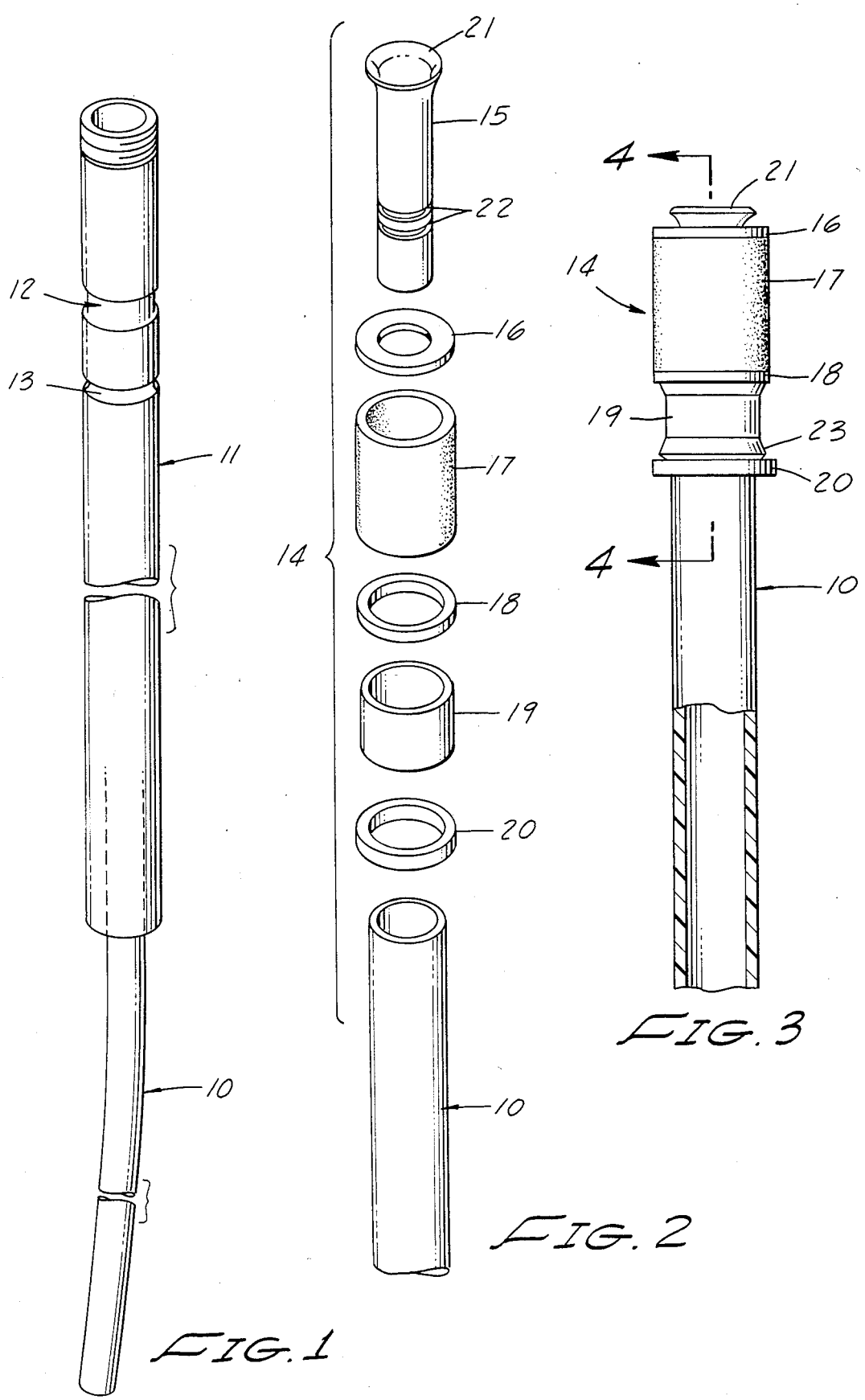
FIG. 1 depicts a perspective view of the transition fitting of the present invention shown relating a plastic pipe to a metal pipe.
FIG. 2 shows the various component parts of the fitting for mounting onto a plastic pipe and shown in exploded relation.
FIG. 3 is a side elevational, partially sectional view of the plastic pipe showing the parts of FIG. 2 assembled thereon.

With reference now to the drawings and particularly FIG. 1, there is shown a length of plastic pipe 10, shown received within the open end of a larger diameter metal pipe 11, the two pipes being interconnected with a transition fitting to be described and which is totally enclosed within the metal pipe 11. The only outward visible characteristics of the transition fitting that can be seen in FIG. 1 is a ring 12 of reduced metal pipe diameter produced by a clamping force being applied about the pipe circumference and a further groovelike ring 13, both of which will be later described in detail.

Turning to FIG. 2, there is shown in exploded relation an end portion of the plastic pipe 10 with various transition fitting components collectively enumerated as 14 which components are assembled onto the plastic pipe 10 as is generally shown in FIG. 3. As will be more fully described, the fitting components 14 comprise all of the additional members that are needed in order to produce a satisfactory transition fitting in accordance with the present invention between the plastic pipe and the metal pipe. However the entire transition fitting consists of the fitting components 14 as well as certain modifications effected in the two pipes in order to produce the final transition fitting.

Still referring to FIG. 2, the component parts are seen to include, in the order in which they are assembled together, an insert tube 15, a washer 16, a cylindrical seal 17, a first retainer ring 18, a compressible bushing 19, and a second retainer ring 20.

Figure 4:
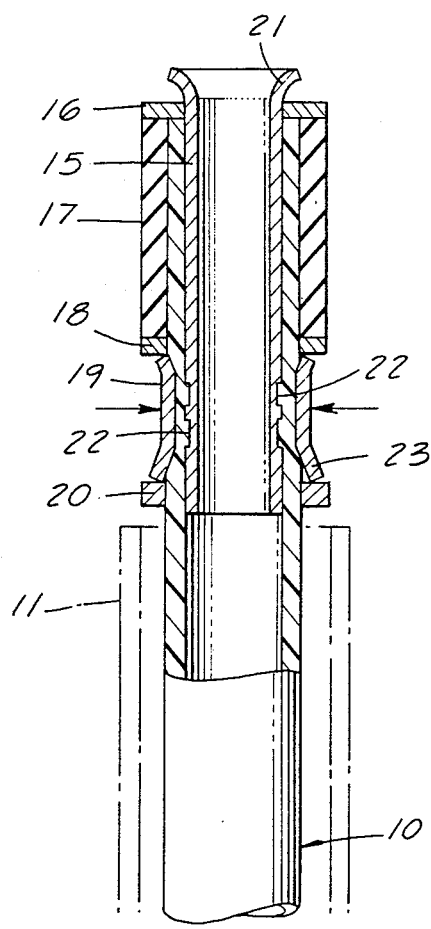
FIG. 4 is a side elevational, sectional view taken along the line 4—4 of FIG. 3.

The insert tube 15 is a tubular metal member having an outer diameter enabling a sliding fit within the bore of the plastic pipe 10 (FIG. 4). An outer end is flared outwardly (21) to form an outer diameter end which is sufficient to prevent it being forced into the end of the plastic pipe. Adjacent the insert tube other end are a plurality of circumferential, spaced-apart grooves 22 which in assembly will serve as an anchoring means for the insert within the plastic tube as will be described.

The washer 16 as well as the retainer rings 18 and 20 all have an outer diameter enabling sliding receipt within the metal pipe 11. The internal diameter or bore diameter of the washer 16 is slightly larger than the outer diameter of the tube insert permitting the washer to be slid onto the insert as shown in FIG. 4, but not being able to be moved past the flared end 21. The retainer rings 18 and 20 have bores slightly larger than the outer diameter of the plastic pipe such that they can be received thereon as also shown in FIG. 4.

The cylindrical seal 17 is constructed of an easily pliable rubber and has an internal diameter enabling snug, but sliding, fit onto the plastic tube 10. The outer diameter is substantially identical to that of the washer and two retaining rings. It is important that the material from which the cylindrical seal is constructed be compressible and generally pliant in order to produce the sealing relationship desired.

The bushing 19 is a length of tubular metal which initially has an internal bore closely approximating that of the plastic pipe outer diameter and an outer diameter slightly less than that of the retaining rings. The bushing is constructed of a material sufficiently malleable to permit it to be compressed about the plastic tube without fracturing or otherwise being damaged and in that way being clamped onto the tube. A satisfactory metal for this purpose is aluminum or brass.

To assemble the fitting components 14 onto the plastic pipe, first all of the parts but the tube insert and washer 16 are located on an end portion of the plastic pipe as shown in FIG. 4. That is, in the order named, first the retainer ring 20, then the compressible bushing 19, followed by the retainer ring 18 and cylindrical seal 17 are slid onto the plastic pipe end portion. It should be noted that this initial positioning of the parts on the plastic pipe is such that the outer end of the cylindrical seal coincides with the outer end of the plastic pipe (FIG. 4). Next, the tubular insert with the washer 16 mounted thereon is forced into the end of the plastic pipe so that the washer abuts against the end of the plastic pipe as well as the end of the seal 17 and the flared end 21 drives against the washer to maintain this position.

Figure 5:
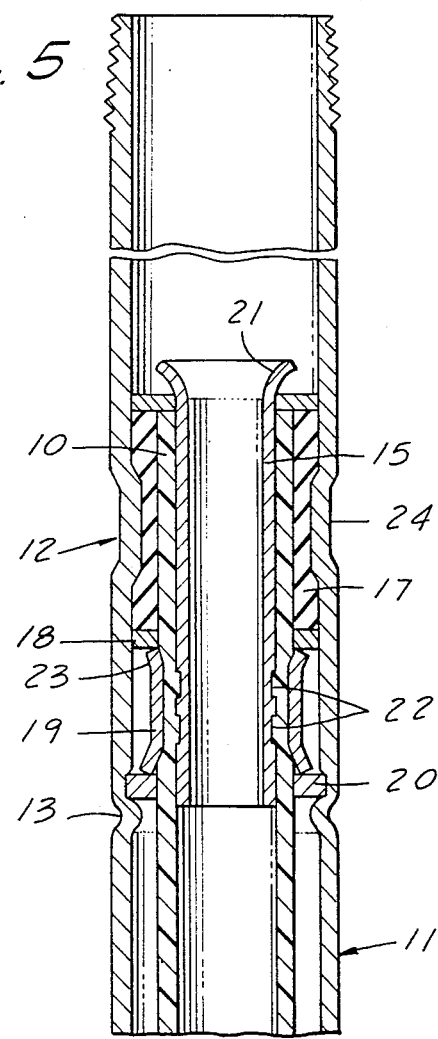
FIG. 5 a further side elevational, sectional view showing the entire assembled transition fitting relating a plastic pipe to a metal pipe.
Figure 6:
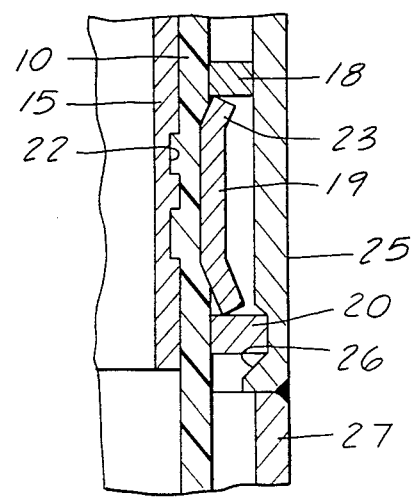
FIG. 6 is an enlarged side elevational, sectional, partially fragmentary view through a portion of another embodiment of the fitting.

With the transition fitting components located on the end portion of the plastic pipe as just described, with the bushing contacting the outer surface of the retainer ring 18 forcing it against the adjacent end of the seal 17, a compressing force (arrows) is radially applied throughout the entire circumference of the bushing 19 causing it to be reduced in diameter and force the internal plastic of the pipe 10 into grooves 22 on the insert tube 15 (FIGS. 4 through 6). It is to be noted that the clamping force is applied to an extent across the central portion of the bushing 19 which exceeds the width of the grooves 22, but at the same time the compressive force leaves end portions of the bushing uncompressed enumerated as 23.

As described to this point, the insert tube, seal, washer and retainer rings, are all held onto the end portion of the plastic pipe in a secure manner by the combination of the flared insert end 21 and the clamping force of the bushing as well as the internal result of the clamping force, namely, the physical engagement of the plastic pipe inner wall with the grooves 22. The end of the plastic pipe with the fitting components 14 mounted thereon is shown in FIG. 3, and the plastic pipe is now ready for final assembly into the metal pipe 11 in the manner of the invention.

The plastic tube end portion with components 14 mounted thereon, is then slid into the open end of the pipe 11 as is shown in FIG. 5. The final assembly includes the application of two clamping forces which may be applied either serially or at the same time. First, a radially inwardly directed clamping force of a short longitudinal extent is applied to the circumference of the pipe 11 at substantially the mid point of the cylindrical seal 17. This force is sufficient in order to reduce the internal diameter of the pipe 11 a substantial amount at 24 and press the inner pipe surface against the seal 17, the latter because of its compliant characteristics being also reduced directly underneath the metal pipe in the area of the compression and expanding outwardly and longitudinally therefrom. The outer surface of the pipe 11 is radially deformed just outwardly of the retainer ring 20 at 13 reducing the internal diameter of the pipe 11 which forms a obstruction preventing removal of the retainer ring 20 from the metal tube. Accordingly, as can be seen best in FIG. 5, the transition components mounted on the plastic pipe are now securely maintained within the metal pipe and a gas seal is produced between the plastic and metal pipes by the compression at 24.

Moreover, the double clamping about the cylindrical seal (24) and the metal obstruction clamping about the retainer ring 20 (at 13), the metal pipe and plastic pipes are secured against separating from one another as a result of longitudinal forces along the pipe axis from thermal expansion differences. This is also enhanced by the coaction between the insert tube grooves 22 and the internal surface of the plastic pipe which is locked into these grooves. The two pipes are now joined into a transition fitting which not only is resistant against pulling forces tending to separate the two, but also provides a gas-tight seal.

FIG. 6 depicts a further embodiment with means specifically to substitute for the circumferential recess 13 that assists in holding the plastic pipe and transition fitting parts mounted thereon within the metal pipe . In this version, on assembly the lower end of a short metal pipe or nipple 25 is positioned just beyond the retainer ring 20 and the nipple end is rolled inwardly at 26 to secure the retainer ring. Then, a longer pipe section 27 is welded onto the nipple rolled end.

In assembly, the cylindrical seal 17 is not only compressed radially by the clamping at 12, but is compressed longitudinally as a result of the ends being retained by washer 16 and retainer ring 18 during the clamping at 12. All of this insures an excellent gas-tight seal being achieved.

What is claimed is:

1. A transition fitting for interconnecting a plastic pipe with a larger diameter metal pipe, comprising:
   a first retainer ring for receipt onto an end portion of the plastic pipe;
   a compressible bushing for clamping receipt on the plastic pipe end portion in contact with said first retainer ring;
   a second retainer ring for receipt on the plastic pipe contacting the compressible bushing;
   a pliant cylindrical seal for receipt on the plastic pipe in contact with the second retainer ring;
   a washer on the plastic pipe contacting the cylindrical seal; and
   an insert tube for receipt within said plastic pipe end portion having an enlarged end contacting the washer;

in assembly said plastic pipe end portion being received within the metal pipe and a portion of the metal pipe being deformed to clampingly engage and distend the pliant cylindrical seal.

2. A termination fitting as in claim 1, in which the compressible bushing is constructed of a malleable material, and the outer surface of that part of the insert for receipt within the plastic pipe includes a plurality of grooves which bite into the opposing inner surface of the plastic pipe upon clamping of the bushing.

3. A transition fitting as in claim 1, in which a portion of the metal pipe wall located just outwardly of the second retainer ring is deformed inwardly to form an obstruction tending to prevent removal of the plastic pipe from the metal pipe.

4. A transition fitting as in claim 1, in which the insert tube has a end flared to form the enlarged end.

* * * * *